US012384163B2

(12) United States Patent
Hayashi et al.

(10) Patent No.: US 12,384,163 B2
(45) Date of Patent: Aug. 12, 2025

(54) TANK CONNECTABLE TO LIQUID CONTAINER, AND LIQUID SUPPLYING SYSTEM INCLUDING TANK AND LIQUID CONTAINER

(71) Applicant: BROTHER KOGYO KABUSHIKI KAISHA, Nagoya (JP)

(72) Inventors: Masahiro Hayashi, Nishio (JP); Naoya Okazaki, Hashima (JP); Satoru Oki, Nagoya (JP); Nanami Abe, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/596,759

(22) Filed: Mar. 6, 2024

(65) Prior Publication Data

US 2024/0208235 A1 Jun. 27, 2024

Related U.S. Application Data

(63) Continuation of application No. 17/834,058, filed on Jun. 7, 2022, now Pat. No. 11,951,747.

(30) Foreign Application Priority Data

Jun. 18, 2021 (JP) ................................ 2021-101637

(51) Int. Cl.
*B41J 2/175* (2006.01)

(52) U.S. Cl.
CPC ................................ *B41J 2/17523* (2013.01)

(58) Field of Classification Search
CPC .... B41J 2/17513; B41J 2/17596; B41J 2/175; B41J 2/17506; B41J 2/17523;
(Continued)

(56) References Cited

U.S. PATENT DOCUMENTS 9,193,166 B1 11/2015 Yabuki
2013/0050358 A1 2/2013 Kanbe et al.
(Continued)

FOREIGN PATENT DOCUMENTS

JP 2013-049167 A 3/2013
JP 2020-128254 A 8/2020
JP 2020-168823 A 10/2020

OTHER PUBLICATIONS

Search Report and Written Opinion issued in corresponding International Application No. PCT/JP2022/022907, Aug. 9, 2022.

*Primary Examiner* — Jannelle M Lebron
(74) *Attorney, Agent, or Firm* — Merchant & Gould P.C.

(57) ABSTRACT

A tank includes: a tank body defining a storage chamber; a recessed portion provided at the tank body; a slider positioned in the recessed portion; a fitting portion provided at the slider; and a sealing member. The recessed portion has an injection opening in communication with the storage chamber, and a connection opening through which a liquid container is connectable. The slider includes a nozzle extending toward the connection opening in an extending direction and having a communication opening communicable with the injection opening. The slider is movable toward and away from the connection opening in the extending direction while rotating relative to the recessed portion. The fitting portion can be fitted with the liquid container. The sealing member can provide a liquid tight sealing to a gap between the slider and the recessed portion, and allow liquid flow between the communication opening and the injection opening.

16 Claims, 14 Drawing Sheets

(58) Field of Classification Search
CPC .. B41J 2/17509; B41J 2/1754; B41J 2/17553; B41J 2/17566; B41J 29/02; B41J 29/13
See application file for complete search history.

(56) References Cited

U.S. PATENT DOCUMENTS

| | | | |
|---|---|---|---|
| 2013/0162733 | A1 | 6/2013 | Nakamura et al. |
| 2016/0355021 | A1* | 12/2016 | Kanbara .............. B41J 2/17523 |
| 2020/0070497 | A1 | 3/2020 | Lin |

* cited by examiner

TANK CONNECTABLE TO LIQUID CONTAINER, AND LIQUID SUPPLYING SYSTEM INCLUDING TANK AND LIQUID CONTAINER

REFERENCE TO RELATED APPLICATIONS

This application is a continuation of U.S. patent application Ser. No. 17/834,058 filed on Jun. 7, 2022, now U.S. Pat. No. 11,951,747, which claims priority from Japanese Patent Application No. 2021-101637 filed on Jun. 18, 2021. The entire contents of the aforementioned applications are incorporated herein by reference.

BACKGROUND ART

In a conventional printing device, there has been known a structure for supplying ink to a tank from a container connected to the tank each time the ink stored in the tank is consumed. The container has a supply opening for supplying the ink. In order to prevent the ink leakage through the supply opening, conceivably, a conventional supply valve provided in an ink cartridge may be employed in the container. Further, in order to promote smooth outflow of the ink through the supply opening of the container, preferably, the container may have an air communication passage. In order to open and close the air communication passage, an air releasing valve may be employed in the container.

SUMMARY

The conventional supply valve and the air releasing valve described above are urged by springs to close the supply opening and the air communication passage, respectively. If such valves are provided in the container, a user needs to push the container against the tank or to keep the container pressed against the tank, against the urging force of the springs, when connecting the container to the tank. Further, the container is likely to bound off the tank due to the urging force of the springs when the user attempts to remove the container from the tank.

In view of the foregoing, it is an object of the present disclosure to provide a structure capable of enhancing user's convenience upon attachment and detachment of the container to and from the tank.

In order to attain the object, according to a first aspect, the disclosure provides a tank to which a liquid container is connectable. The tank includes a tank body, a recessed portion provided at the tank body, a slider positioned in the recessed portion, a fitting portion provided at the slider, and a sealing member. The tank body defines a tank storage chamber configured to store liquid therein. The recessed portion has an injection opening in communication with the tank storage chamber and a connection opening through which the liquid container is connectable. The slider is rotatable relative to the recessed portion. The slider includes a nozzle extending toward the connection opening in an extending direction. The nozzle has a communication opening configured to communicate with the injection opening of the recessed portion. The slider is movable toward and away from the connection opening in the extending direction relative to the recessed portion in accordance with rotations of the slider. The fitting portion is configured to be fitted with the liquid container. The sealing member is configured to provide a liquid tight sealing to a gap between the slider and the recessed portion, and configured to also allow the liquid to flow between the communication opening of the nozzle and the injection opening of the recessed portion.

With this structure, as the liquid container fitted with the fitting portion of the slider is rotated, the slider rotates relative to the recessed portion and slidingly moves together with the nozzle. When the nozzle enters into a supply opening of the liquid container, the liquid in the liquid container flows into the tank storage chamber through the nozzle.

According to another aspect, the disclosure provides a liquid supplying system including a liquid container and a tank. The liquid container includes a casing, a container storage chamber, a supply opening, and a counter-fitting portion. The container storage chamber is defined in the casing and is configured to store liquid therein. The supply opening provides fluid communication between the container storage chamber and an outside of the casing. The counter-fitting portion is provided at the casing. The tank includes a tank body, a recessed portion, a slider, a first fitting portion, and a sealing member. The tank body defines therein a tank storage chamber configured to store therein liquid. The recessed portion is provided at the tank body. The recessed portion has an injection opening in communication with the tank storage chamber and a connection opening through which the liquid container is connectable. The slider is positioned in the recessed portion and is rotatable relative to the recessed portion. The slider includes a nozzle extending toward the connection opening in an extending direction. The nozzle has a communication opening configured to communicate with the injection opening of the recessed portion. The slider is movable toward and away from the connection opening in the extending direction relative to the recessed portion in accordance with rotations of the slider. The first fitting portion is provided at the slider and is configured to be fitted with the counter-fitting portion. The sealing member is configured to provide a liquid tight sealing to a gap between the slider and the recessed portion, and is configured to also allow the liquid to flow between the communication opening of the nozzle and the injection opening of the recessed portion.

With this structure, as the liquid container is rotated with the first fitting portion on the slider fitted with the counter-fitting portion of the liquid container, the slider rotates relative to the recessed portion and slidingly moves together with the nozzle. When the nozzle of the slider enters into the supply opening of the liquid container, the liquid in the container storage chamber flows into the tank storage chamber through the nozzle.

BRIEF DESCRIPTION OF DRAWINGS

The particular features and advantages of the embodiment (s) as well as other objects will become apparent from the following description taken in connection with the accompanying drawings, in which.

DESCRIPTION

Figure 1:
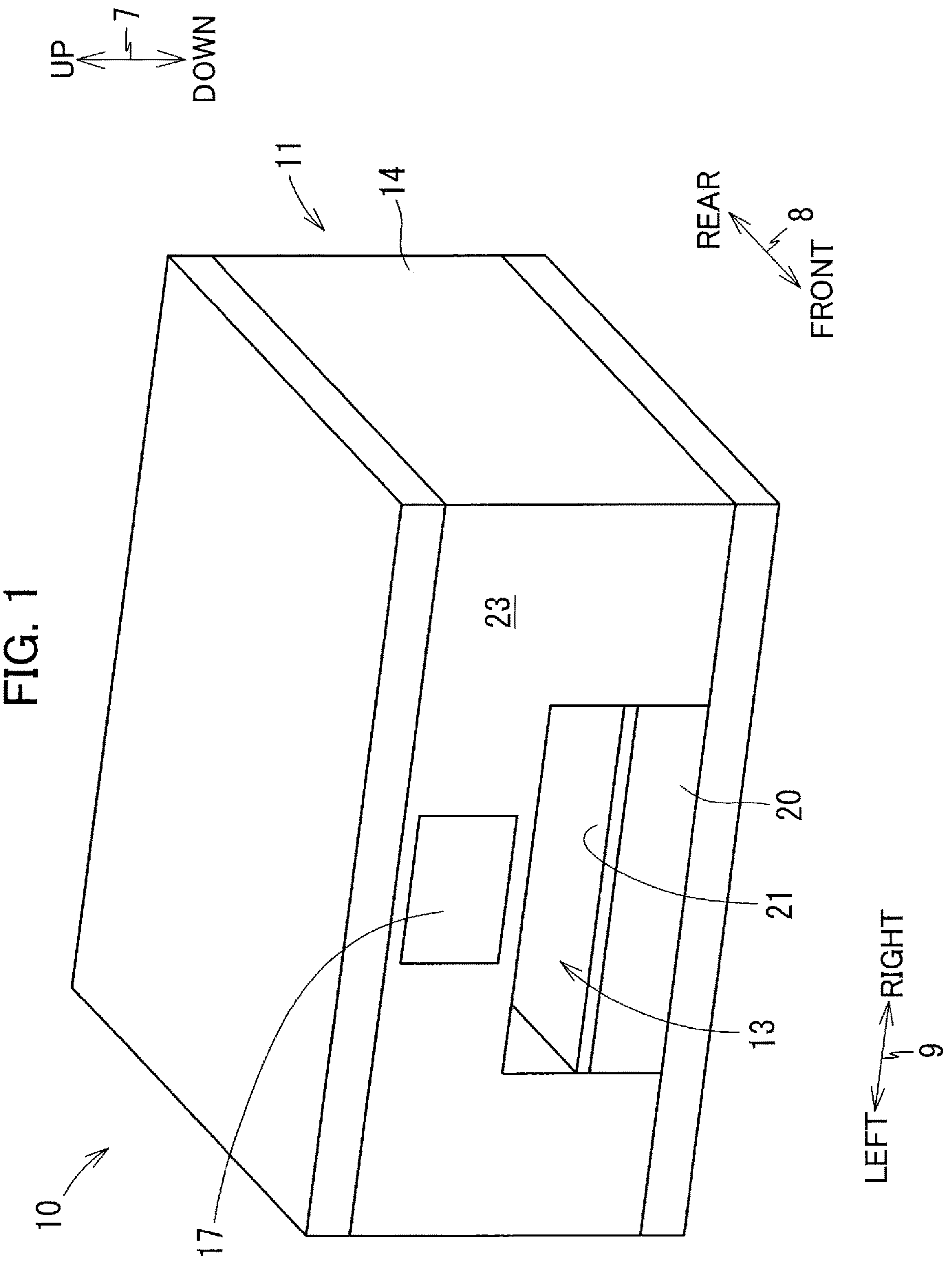
FIG. 1 is a perspective view of a multifunction device 10.

Hereinafter, one embodiment of the present disclosure will be described with reference to FIGS. 1 through 10. Incidentally, the embodiment described below is a mere example of the present disclosure, and it would be apparent to those skilled in the art that many modifications and variations may be made thereto without departing from the spirit of the disclosure.

Further, in the following description, upper and lower sides with regard to the multifunction device 10 will be referred to based on an assumption that the multifunction device 10 is disposed on a horizontal surface, i.e., in an operable posture in which the multifunction device 10 is intended to be used (the posture illustrated in FIG. 1). Specifically, front and rear sides of the multifunction device 10 will be referred to assuming that a surface having an opening 13 of the multifunction device 10 is defined as a front surface of the multifunction device 10 in the operable posture. Left and right sides of the multifunction device 10 will be referred to assuming that the multifunction device 10 in the operable posture is viewed from its front surface.

Further, in the following description, a leftward direction and a rightward direction will be collectively referred to as a left-right direction 9, wherever appropriate. Likewise, a frontward direction and a rearward direction will be collectively referred to as a front-rear direction 8, and an upward direction and a downward direction will be collectively referred to as an up-down direction 7, wherever appropriate. In the present embodiment, the up-down direction 7 is assumed to be vertical, and the front-rear direction 8 and the left-right direction 9 are both assumed to be horizontal. The front-rear direction 8 and the left-right direction 9 are perpendicular to each other.

<Overall Structure of the Multifunction Device 10>

As illustrated in FIG. 1, the multifunction device 10 includes a housing 14 having a shape of a generally rectangular parallelepiped. A printer portion 11 is provided in a lower portion of the housing 14. The multifunction device 10 has various functions such as a facsimile function and a printing function. The multifunction device 10 employs, as the printing function, an inkjet recording system to record an image on one side of a sheet 12. Incidentally, the multifunction device 10 may be configured to record images on both sides of the sheet 12.

An operating portion 17 is provided at an upper portion of the housing 14. The operating portion 17 includes buttons configured to be manipulated to input various commands for recording images and various settings, and a liquid crystal display configured to display various information thereon. In the present embodiment, the operating portion 17 is constituted as a touch panel providing the functions of both the buttons and the liquid crystal display.

Figure 2:
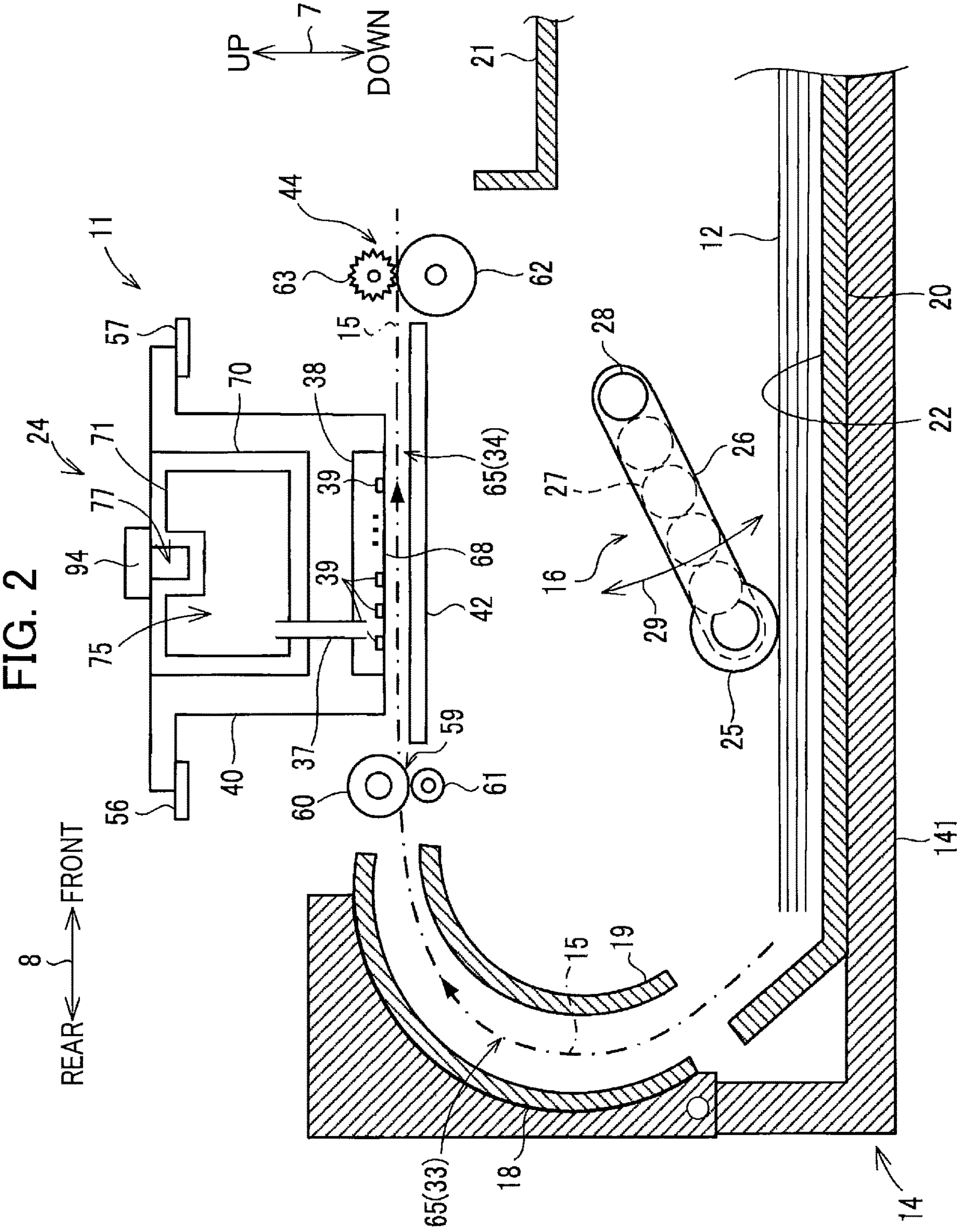
FIG. 2 is a vertical cross-sectional view schematically illustrating an internal structure of a printer portion 11 of the multifunction device 10.

As illustrated in FIG. 2, the printer portion 11 includes a sheet tray 20, a pick-up unit 16, an outer guide member 18, an inner guide member 19, a pair of conveyer rollers 59, a pair of discharge rollers 44, a platen 42, and a recording unit 24. These parts of the printer portion 11 are positioned in an interior of the housing 14. Further, in the interior of the housing 14, there are provided various condition sensors configured to detect various conditions of the multifunction device 10 and to output signals responsive to the result of the detections. Incidentally, the structure of the printer portion 11 according to the embodiment is merely an example, and may be replaced with other conventional structure.

<Sheet Tray 20>

As illustrated in FIG. 1, the opening 13 is open at a front surface 23 of the printer portion 11. The sheet tray 20 is movable in the front-rear direction 8 through the opening 13 so that the sheet tray 20 can be inserted into and removed from the housing 14. The sheet tray 20 is movable between a sheet supplying position (illustrated in FIGS. 1 and 2) where the sheet tray 20 is attached to the housing 14 and a non-sheet supplying position where the sheet tray 20 is pulled out of the housing 14. More specifically, the sheet tray 20 is inserted rearward relative to the housing 14 to provide the sheet supplying position, and is withdrawn frontward relative to the housing 14 to provide the non-sheet supplying position.

The sheet tray 20 has a box-like shape whose upper end is open upward, and is configured to accommodate therein the sheets 12. As illustrated in FIG. 2, a stack of the sheets 12 is supported on a bottom plate 22 of the sheet tray 20. A discharge tray 21 is positioned above a front portion of the sheet tray 20. After an image is recorded on the sheet 12 by the recording unit 24, the sheet 12 is configured to be discharged onto the discharge tray 21 to be supported on an upper surface of the discharge tray 21.

As illustrated in FIG. 2, the sheet 12 supported on the sheet tray 20 is configured to be conveyed to a sheet conveying passage 65 when the sheet tray 20 is at the sheet supplying position.

<Pick-Up Unit 16>

As illustrated in FIG. 2, the pick-up unit 16 is positioned below the recording unit 24 and above the bottom plate 22 of the sheet tray 20. The pick-up unit 16 includes a pick-up roller 25, a pick-up arm 26, a power transmission mechanism 27, and a shaft 28.

The pick-up roller 25 is rotatably supported by a tip end portion of the pick-up arm 26. The pick-up arm 26 has a base end portion at which the shaft 28 is provided. The pick-up arm 26 is pivotally movable about an axis of the shaft 28 in directions indicated by a bidirectional arrow 29. With this structure, the pick-up roller 25 can contact and separate from the sheet tray 20 or an uppermost sheet 12 of the sheet stack supported on the sheet tray 20.

The power transmission mechanism 27 includes a gear train and is configured to transmit a driving force of a motor (not shown) to the pick-up roller 25 to rotate the same. Accordingly, the uppermost sheet 12 of the sheet stack supported on the bottom plate 22 of the sheet tray 20 at the sheet supplying position (i.e., the uppermost sheet 12 in contact with the pick-up roller 25) is configured to be conveyed to the sheet conveying passage 65.

<Sheet Conveying Passage 65>

As illustrated in FIG. 2, the sheet conveying passage 65 extends from a rear end portion of the sheet tray 20. The sheet conveying passage 65 includes a curved portion 33 and a linear portion 34. The curved portion 33 has a generally U-shape extending diagonally upward and rearward and then making a curve toward the front. The linear portion 34 extends approximately in the front-rear direction 8.

The curved portion 33 is defined by the outer guide member 18 and the inner guide member 19 facing each other and spaced away from each other by a predetermined interval. The outer guide member 18 and the inner guide member 19 both extend in the left-right direction 9. The linear portion 34 is partly defined by the recording unit 24 and the platen 42 facing each other in the up-down direction 7 with a predetermined interval therebetween.

The sheet 12 supported by the sheet tray 20 is conveyed along the curved portion 33 by the pick-up roller 25 to reach the pair of conveyer rollers 59 where the sheet 12 is nipped between the pair of conveyer rollers 59. The nipped sheet 12 is then conveyed frontward toward the recording unit 24 along the linear portion 34. When the sheet 12 reaches a position immediately below the recording unit 24, the sheet 12 is subjected to image recordation by the recording unit 24 by deposition of the ink ejected from the recording unit 24 on the sheet 12. The image-recorded sheet 12 is then conveyed frontward along the linear portion 34 and is discharged onto the discharge tray 21. In this way, the sheet 12 is conveyed in a conveying direction 15 which is indicated by a one-dotted chain line in FIG. 2.

<Pair of Conveyer Rollers 59 and Pair of Discharge Rollers 44>

As illustrated in FIG. 2, the pair of conveyer rollers 59 is positioned at the linear portion 34. The pair of discharge rollers 44 is positioned at the linear portion 34 and downstream of the pair of conveyer rollers 59 in the conveying direction 15.

The pair of conveyer rollers 59 includes a conveyer roller 60 and a pinch roller 61 positioned below the conveyer roller 60. The pinch roller 61 is urged toward the conveyer roller 60 by a resiliently urging member such as a coil spring (not illustrated). The pair of conveyer rollers 59 is configured to nip the sheet 12 between the conveyer roller 60 and the pinch roller 61.

The pair of discharge rollers 44 includes a discharge roller 62 and a spur roller 63 positioned above the discharge roller 62. The spur roller 63 is urged toward the discharge roller 62 by a resiliently urging member such as a coil spring (not illustrated). The pair of discharge rollers 44 is configured to nip the sheet 12 between the discharge roller 62 and the spur roller 63.

The conveyer roller 60 and the discharge roller 62 are driven to rotate upon receipt of the driving force from the motor (not shown). As the conveyer roller 60 rotates with the sheet 12 nipped between the conveyer rollers 59, the sheet 12 is conveyed in the conveying direction 15 onto the platen 42 by the pair of conveyer rollers 59. As the discharge roller 62 rotates with the sheet 12 nipped by the pair of discharge rollers 44, the sheet 12 is conveyed in the conveying direction 15 onto the discharge tray 21 by the pair of discharge rollers 44.

<Platen 42>

As illustrated in FIG. 2, the platen 42 is positioned along the linear portion 34 of the sheet conveying passage 65. The platen 42 faces the recording unit 24 in the up-down direction 7. The platen 42 is configured to support the sheet 12 conveyed along the sheet conveying passage 65 from below.

<Recording Unit 24>

As illustrated in FIG. 2, the recording unit 24 is positioned above the platen 42. The recording unit 24 includes a carriage 40, a head 38, and a tank 70.

The carriage 40 is movably supported by guide rails 56, 57. The guide rails 56, 57 are spaced away from each other in the front-rear direction 8 and support the carriage 40 such that the carriage 40 is movable reciprocatingly in the left-right direction 9 perpendicular to the conveying direction 15. The guide rail 56 is positioned upstream of the head 38 in the conveying direction 15, and the guide rail 57 is positioned downstream of the head 38 in the conveying direction 15. The guide rails 56, 57 are supported by a pair of side frames (not illustrated) positioned outward of the linear portion 34 of the sheet conveying passage 65 in the left-right direction 9. The carriage 40 is movable upon receipt of the driving force from the motor (not shown).

The head 38 is supported by the carriage 40. The head 38 has a lower surface 68 exposed downward to an outside and facing the platen 42. The head 38 includes a plurality of nozzles 39, an ink passage 37, and piezoelectric elements (not illustrated).

The plurality of nozzles 39 are open at the lower surface 68 of the head 38. The ink passage 37 connects the plurality of nozzles 39 to the tank 70. The piezoelectric elements are respectively configured to deform in the ink passage 37 when supplied with power, thereby ejecting ink droplets downward from the corresponding nozzles 39.

<Tank 70>

Figure 3:
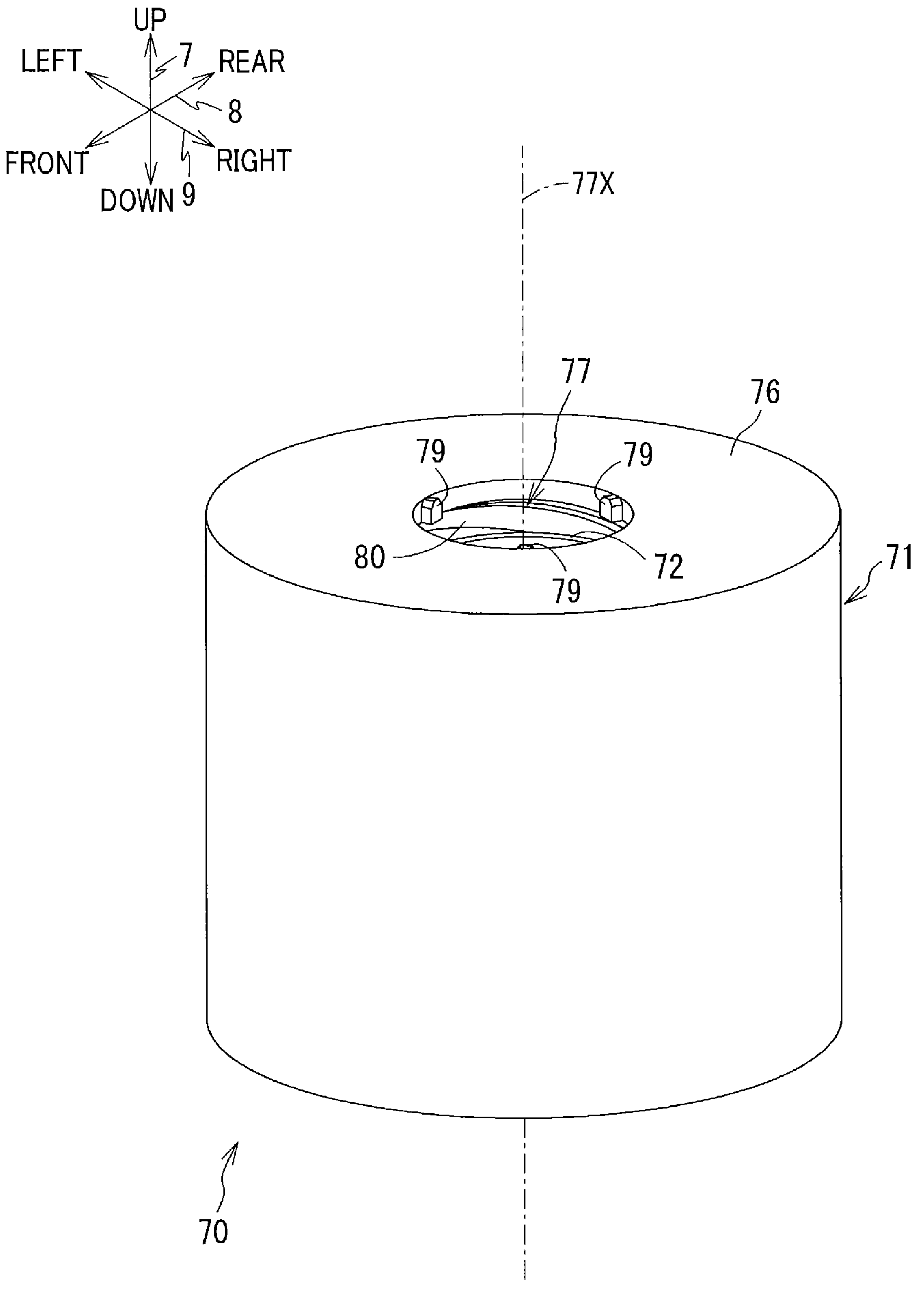
FIG. 3 is a perspective view of a tank 70 of the multifunction device 10.
Figure 4:
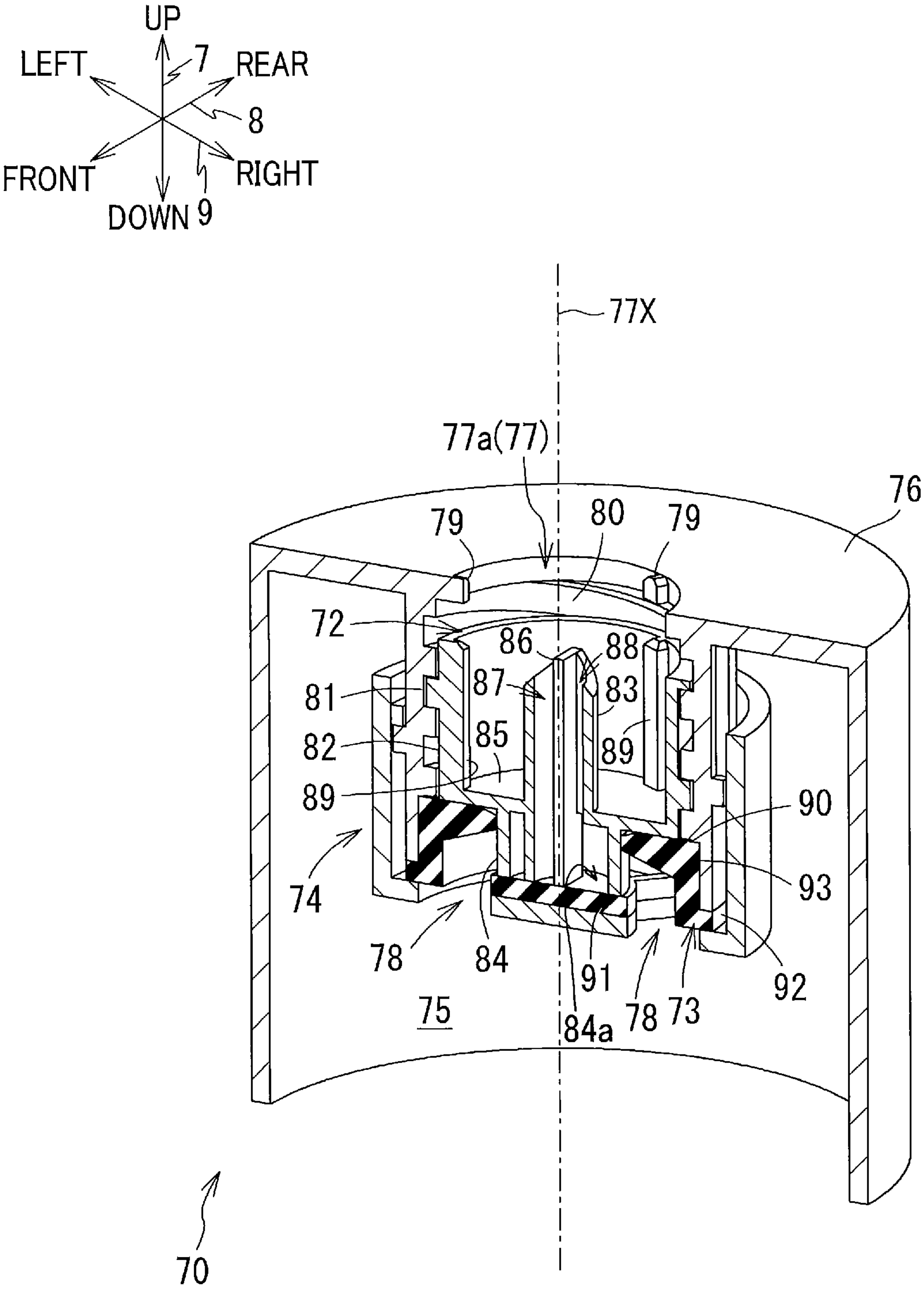
FIG. 4 is a vertical cross-sectional view of the tank 70 taken along a cross-section containing an axis 77X of the tank 70 and extending in an up-down direction 7.

As illustrated in FIG. 2, the tank 70 is mounted on the carriage 40. As illustrated in FIGS. 2 through 4, the tank 70 includes a tank body 71, a slider 72, a sealing member 73, and a cover 74.

As illustrated in FIG. 2, the tank 70 is positioned above the head 38. Incidentally, in the present embodiment, the tank 70 in its entirety is positioned above the head 38, but the positional relationship between the tank 70 and the head 38 may be suitably modified. In the present embodiment, the recording unit 24 includes the single tank 70. Black ink is stored in the single tank 70. Incidentally, the color of the ink stored in the tank 70 need not be black.

As illustrated in FIG. 4, the tank body 71 has a tank storage chamber 75. Ink is stored in the tank storage chamber 75. As illustrated in FIG. 2, the tank storage chamber 75 of the tank body 71 is in communication with the plurality of nozzles 39 through the ink passage 37. Accordingly, the ink in the tank storage chamber 75 is supplied to the nozzles 39. Incidentally, a bottom of the tank body 71 is not depicted in FIG. 4.

As illustrated in FIGS. 3 and 4, the tank body 71 includes an upper wall 76 formed with a recessed portion 77 recessed toward the tank storage chamber 75. The recessed portion 77 has a hollow cylindrical shape protruding downward from the upper wall 76, and has a lower open end. That is, the recessed portion 77 is open upward to provide a connection opening 77*a* on the upper wall 76. A bottle 100 (see FIG. 5) can be connected to the recessed portion 77 through the opening 77*a* to provide fluid communication between internal spaces of the recessed portion 77 and the bottle 100. The recessed portion 77 has an outer surface with which the cover 74 is fitted. The cover 74 has a bottom wall formed with an injection opening 78 for injecting the ink to the tank storage chamber 75. The sealing member 73 is interposed between the cover 74 and the lower end of the recessed portion 77.

The recessed portion 77 has an upper end portion where three protrusions 79 are positioned, the upper end portion defining the connection opening 77*a* therein. The three protrusions 79 are spaced apart from each other at equal intervals by 120 degrees about an axis 77X of the recessed portion 77 as a center. Each of the protrusions 79 protrudes toward the axis 77X from an inner peripheral surface of the upper end portion of the recessed portion 77.

As illustrated in FIG. 4, a female thread 80 is formed in an inner peripheral surface of the recessed portion 77. The female thread 80 is threadingly engageable with a male thread 81 formed on an outer peripheral surface of the slider 72. As the slider 72 rotates clockwise relative to the recessed portion 77 in a state where the female thread 80 and the male thread 81 are threadingly engaged with each other, the slider 72 moves downward in the internal space of the recessed portion 77. As the slider 72 rotates counterclockwise relative to the recessed portion 77, the slider 72 moves upward in the internal space of the recessed portion 77.

As illustrated in FIG. 4, the slider 72 includes a slider body 82, and nozzles 83, 84. The slider body 82 has a hollow cylindrical shape and can be accommodated in the recessed portion 77. The slider body 82 has a lower end closed by a lower end wall 85. On the outer peripheral surface of the slider body 82, the male thread 81 is formed. The slider body 82 has a dimension in the up-down direction 7 smaller than a dimension of the internal space of the recessed portion 77 in the up-down direction 7. As such, the slider body 82 is movable in the up-down direction 7 (upward and downward) in a state where the slider body 82 is accommodated in the internal space of the recessed portion 77.

The nozzle 83 extends upward from the lower end wall 85 of the slider body 82, and the nozzle 84 extends downward from the lower end wall 85. The nozzle 83 has a tip end (upper end) having a sharp triangular shape. The nozzle 84 has a tip end (lower end) constituting a flat surface extending in the front-rear direction 8 and the left-right direction 9. The lower end of the nozzle 84 is open downward to provide a communication opening 84*a* (see FIGS. 4 and 10). A partition wall 86 partitions internal spaces of the nozzles 83, 84 to provide two flow channels 87, 88 extending in the up-down direction 7. The flow channel 87 has a constant horizontal cross-sectional area in the up-down direction 7. With regard to the flow channel 88, a horizontal cross-sectional area of the internal space of the nozzle 84 is greater than a horizontal cross-sectional area of the internal space of the nozzle 83. That is, the horizontal cross-sectional area of the flow channel 88 is greater in a lower region below the lower end wall 85 than in an upper region above the lower end wall 85, such that the horizontal cross-sectional area of the flow channel 88 expands in the lower region to provide a stepwise between the upper and lower regions. Lower openings of the flow channels 87 and 88 constitute the communication opening 84*a* formed in the lower end of the nozzle 84.

The slider body 82 has an inner peripheral surface where three ribs 89 are positioned. The three ribs 89 are spaced apart from each other at equal intervals by 120 degrees about the axis 77X of the recessed portion 77 as a center. Each of the ribs 89 protrudes toward the axis 77X of the recessed portion 77 from the inner peripheral surface of the recessed portion 77. Each rib 89 extends in the up-down direction 7 to span from the upper end to the lower end of the slider body 82.

The sealing member 73 is an elastically deformable member made from elastomer or rubber. The sealing member 73 includes a peripheral wall 93 having a flattened hollow cylindrical shape, as illustrated in FIG. 4. The sealing member 73 also includes an upper wall 90 provided at an upper end of the peripheral wall 93, and an abutment plate 91 and a flange 92 provided at a lower end of the peripheral wall 93.

The upper wall 90 has a disc-like shape having an opening at a center region thereof to enable the nozzle 84 to extends through the opening. Specifically, an inner peripheral surface defining the center opening of the upper wall 90 and an outer peripheral surface of the nozzle 84 are in liquid-tight contact with each other. The abutment plate 91 has an outer diameter smaller than an inner diameter of the peripheral wall 93. The abutment plate 91 is connected to the peripheral wall 93 through a plurality of connecting portions such that the abutment plate 91 is positioned at a radial center of the peripheral wall 93. Ink can flow through gaps between the abutment plate 91 and the peripheral wall 93.

Figure 10:
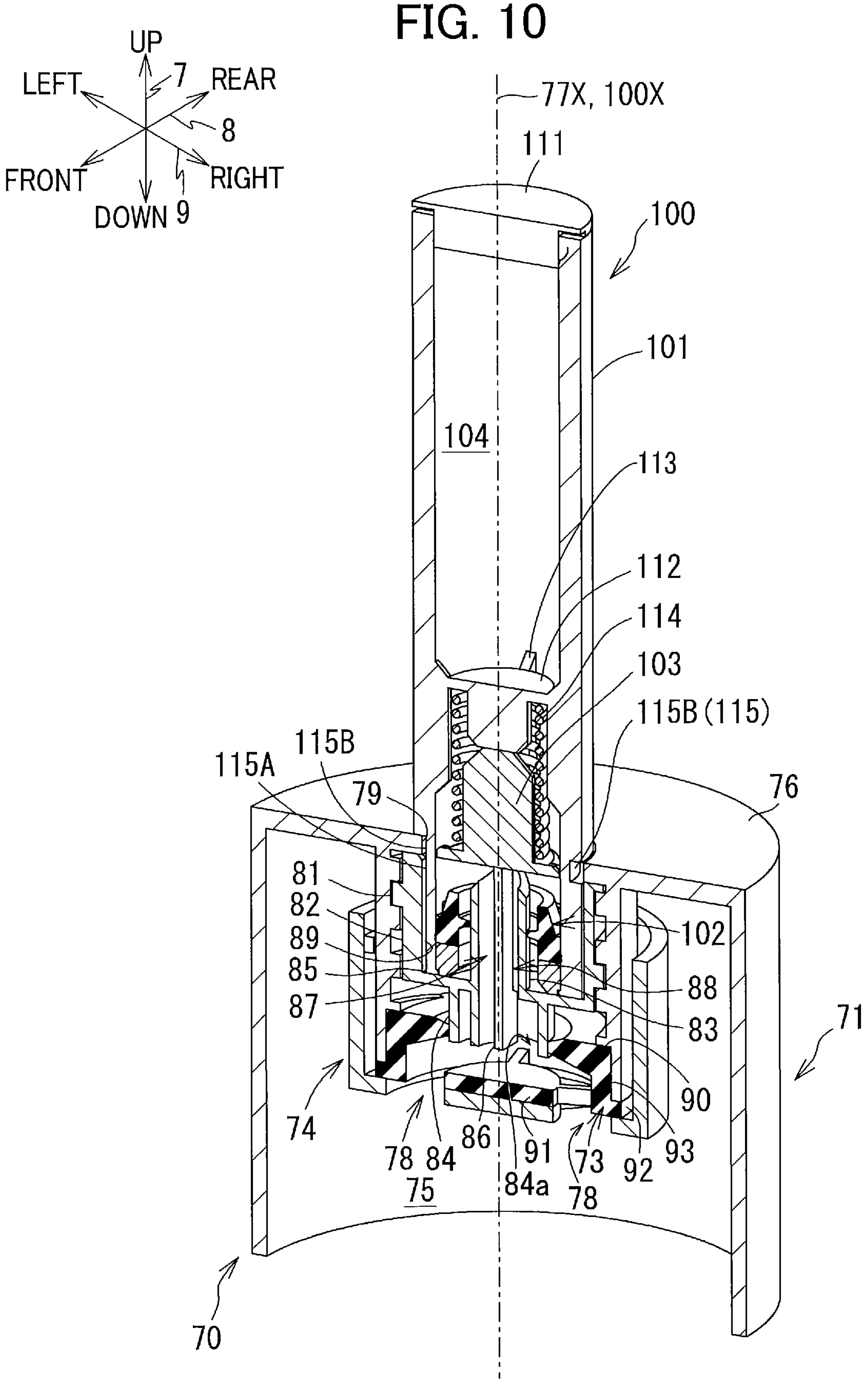
FIG. 10 is a cross-sectional view illustrating the tank 70 and the bottle 100 inserted in the recessed portion 77 of the tank 70 taken along the cross-section containing the axis 77X and extending in the up-down direction 7, and particularly illustrating a state where the bottle 100 is rotated counterclockwise from the state illustrated in FIG. 9.

The outer diameter of the abutment plate 91 is slightly greater than an outer diameter of the nozzle 84. The abutment plate 91 can abut on the tip end (lower end) of the nozzle 84 to close (seal) the tip end of the nozzle 84. The flange 92 protrudes radially outward from the lower end of the peripheral wall 93. The flange 92 is nipped between the cover 74 and the recessed portion 77 so as to be immovable in the upward/downward direction. Hence, the internal space of the recessed portion 77 is liquid tightly sealed against the tank storage chamber 75. The abutment plate 91 is supported by the cover 74 from below. In a state where the tip end of the nozzle 84 is separated from the abutment plate 91 in the up-down direction 7 (as depicted in FIG. 10), ink and air can flow through a gap between the tip end of the nozzle 84 and the injection opening 78 of the cover 74.

As illustrated in FIG. 2, a lid 94 is fitted with the recessed portion 77. Upon detachment of the lid 94 from the recessed portion 77, the internal space of the recessed portion 77 is exposed to the outside. With this exposed state, by inserting the bottle 100 in the recessed portion 77 and rotating the bottle 100, ink is injected from the bottle 100 into the tank storage chamber 75 through the injection opening 78.

Incidentally, the tank 70 may has an air vent opening (not illustrated). Further, the air vent opening may be opened and closed by an electromagnetic valve, for example.

<Bottle 100>

Next, the bottle 100 will be described with reference to FIGS. 5 and 6.

The bottle 100 stores ink therein. The bottle 100 is adapted to supply ink to the tank 70 through the injection opening 78. A combination of the multifunction device 10 and the bottle 100 is an example of a "liquid supplying system" of the disclosure. As illustrated in FIGS. 5 and 6, the bottle 100 includes a casing 101, a sealing member 102, and a valve 103.

Figure 5:
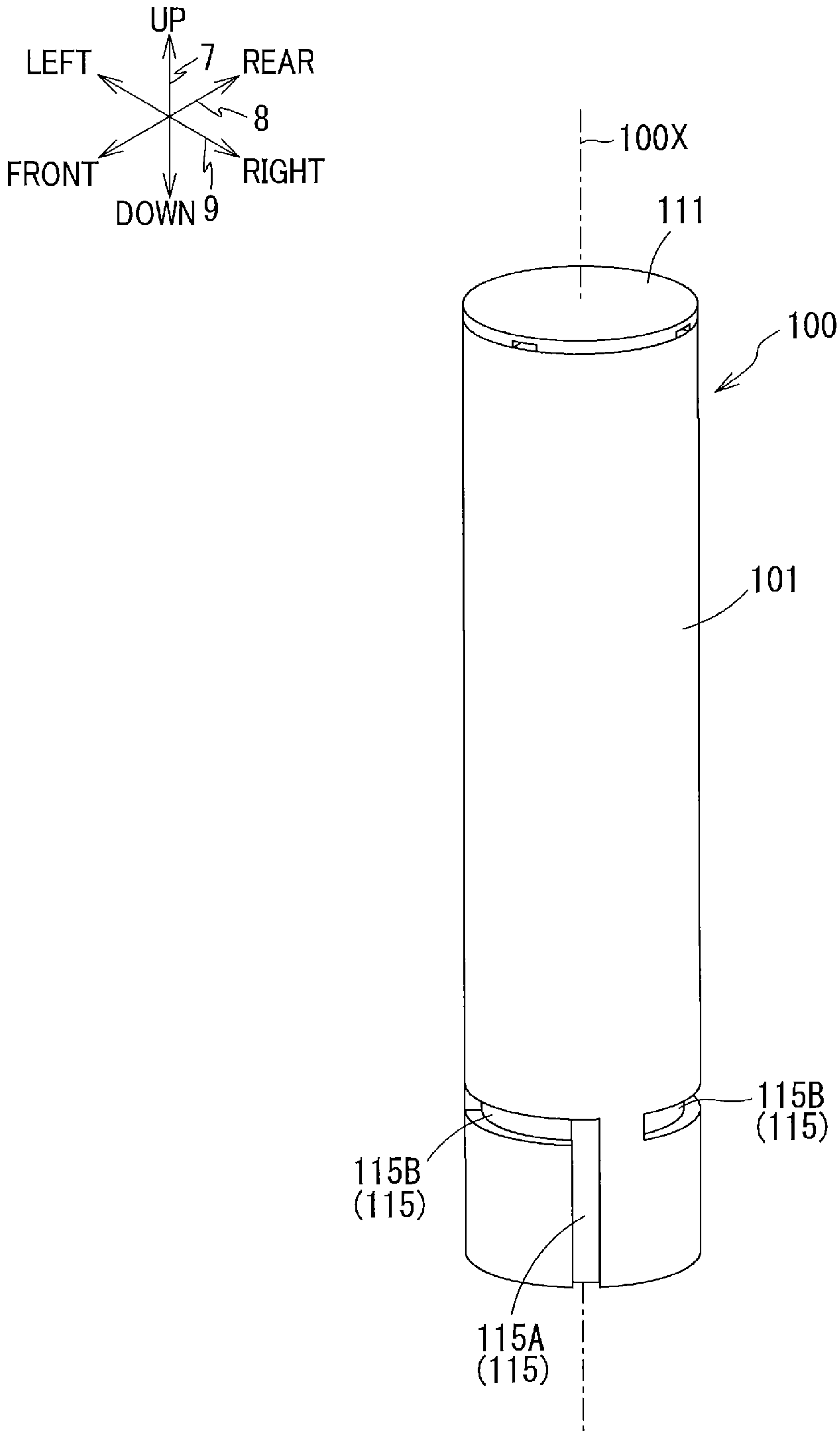
FIG. 5 is a perspective view of a bottle 100.

As illustrated in FIG. 5, the casing 101 has a generally cylindrical outer shape elongated in the up-down direction 7. FIGS. 5 and 6 show a posture of the bottle 100 with a supply opening 105 of the bottle 100 facing downward. However, the bottle 100 may be in such a posture that the supply opening 105 faces upward during transportation or storage thereof.

Figure 6:
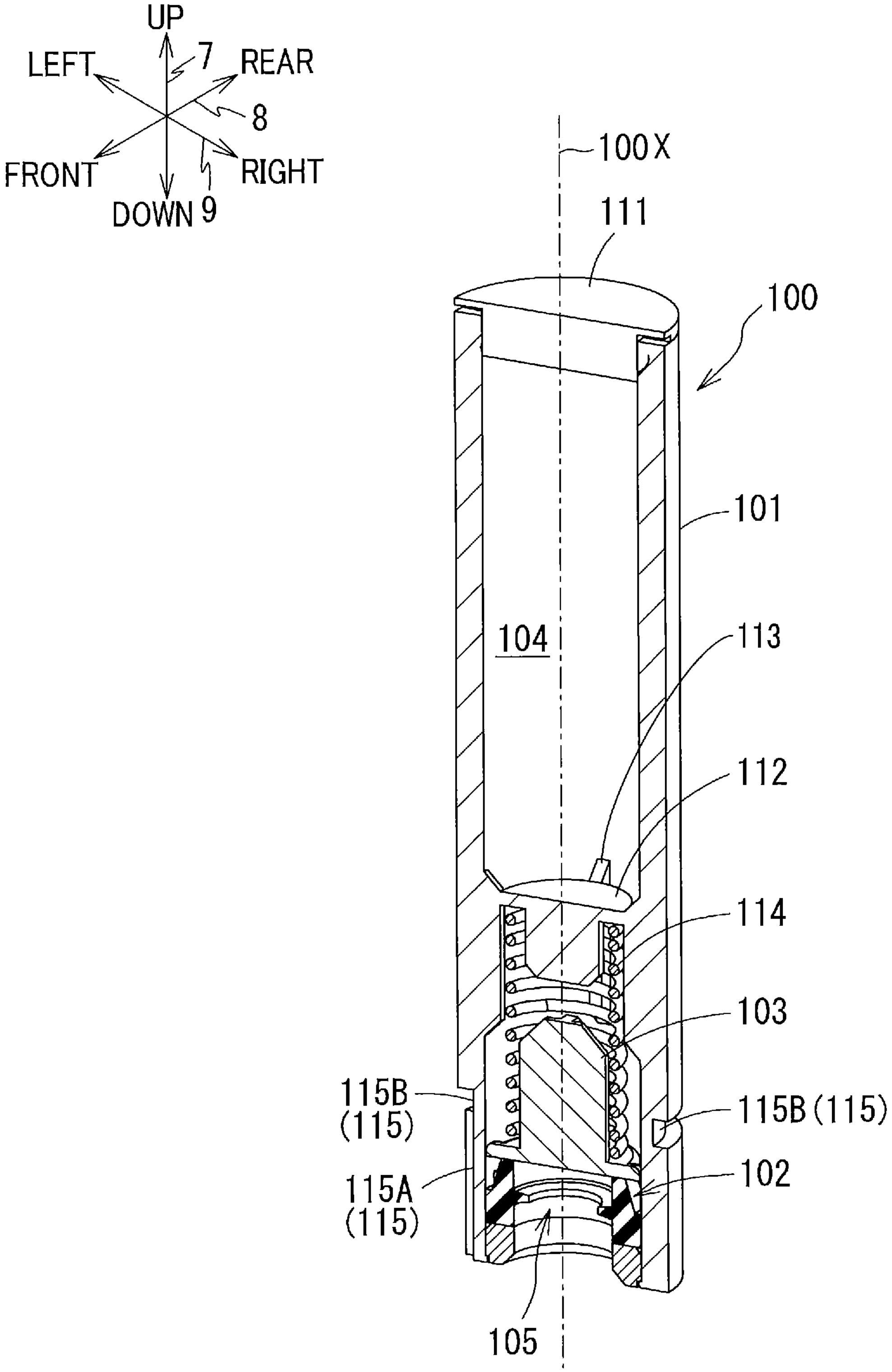
FIG. 6 is a cross-sectional view of the bottle 100 taken along a cross-section containing an axis 100X of the bottle 100 and extending in the up-down direction 7.

As illustrated in FIG. 6, the casing 101 has an open lower end. Further, the casing 101 has an upper open end that is sealed by a cap member 111. The casing 101 has an internal space serving as a storage chamber 104 for storing ink. A spring seat 112 having a solid cylindrical shape is positioned in the storage chamber 104. The spring seat 112 has an upper surface extending in the front-rear direction 8 and the left-right direction 9. The spring seat 112 has an upper end portion provided with a flange protruding outward. The spring seat 112 has a lower end surface on which a coil spring 114 is seated. The spring seat 112 has a lower portion inserted in the coil spring 114. The spring seat 112 has a maximum outer diameter smaller than an inner diameter of the storage chamber 104. The spring seat 112 is connected to an inner peripheral surface of the casing 101 by a plurality of connection ribs 113. Ink can flow through gaps between the spring seat 112 and the inner peripheral surface of the casing 101.

As illustrated in FIG. 6, the sealing member 102 is positioned inside a lower end portion of the casing 101. The sealing member 102 is a hollow cylindrical and elastically deformable member made from rubber or elastomer. The sealing member 102 and the inner peripheral surface of the casing 101 are in contact with each other to provide a liquid tight seal therebetween. The sealing member 102 has upper and lower open ends and defines an internal space serving as the supply opening 105 through with the ink is allowed to flow from the storage chamber 104 to the outside of the storage chamber 104.

As illustrated in FIG. 6, the valve 103 is positioned inside the storage chamber 104. The valve 103 has a generally columnar outer shape. The valve 103 has a lower end portion from which a flange protrudes outward. The flange has an outer diameter smaller than the inner diameter of the storage chamber 104. Hence, ink can flow along an outer peripheral surface of the valve 103. The valve 103 is positioned closer to the sealing member 102 than the spring seat 112 is to the sealing member 102. The coil spring 114 is interposed between the spring seat 112 and the valve 103. The coil spring 114 has one end in abutment with the flange of the spring seat 112 and another end in abutment with the flange of the valve 103 such that the coil spring 114 is in a compressed state.

Due to an urging force of the coil spring 114, a lower end surface of the valve 103 is urged to make contact with the sealing member 102 to provide a liquid tight seal to the supply opening 105. In a case where the nozzle 83 is inserted in the supply opening 105 to come into abutment with the lower end surface of the valve 103 to move the valve 103 away from the sealing member 102 against the urging force of the coil spring 114, the ink in the storage chamber 104 flows out to the outside through the flow channel 87 of the nozzle 83.

As illustrated in FIG. 5, three grooves 115 are formed on the outer peripheral surface of the casing 101. The three grooves 115 are positioned spaced away from each other at equal intervals by 120 degrees about an axis 100X of the bottle 100. Each groove 115 includes a first groove 115A, and a second groove 115B. The first groove 115A extends in the up-down direction 7 and has a lower end that is open at the lower end surface of the casing 101. The second groove 115B extends leftward in FIG. 5 in a circumferential direction of the casing 101 from an upper end of the first groove 115A. The first groove 115A and the second groove 115B are in communication with each other to provide a single space in the groove 115. Each protrusion 79 of the tank 70 can be entered in a corresponding one of the grooves 115.

<Ink Supply from Bottle 100 to Tank 70>

Hereinafter, how ink is supplied from the bottle 100 to the tank 70 will be described with reference to FIGS. 7 through 10.

As the ink in the tank 70 is consumed by ejection of the ink from the nozzles 39 of the head 38, a user will replenish ink with the tank 70 in response to, for example, an alarm indicating that an amount of the ink in the tank 70 becomes smaller. For replenishing ink with the tank 70, the user pivotally moves an upper cover of the multifunction device 10 to expose the upper wall 76 of the tank 70 to the outside. The user then removes the lid 94 from the recessed portion 77 to expose the recessed portion 77 to the outside.

The user holds the bottle 100 containing ink so that the supply opening 105 faces downward, and inserts the lower end portion of the bottle 100 into the recessed portion 77 of the tank 70. At this time, the bottle 100 is in a state where the valve 103 closes the supply opening 105. Further, in the tank 70, the slider 72 is at its lowermost position such that the lower end of the nozzle 84 (i.e., lower openings of the flow channels 87, 88) is closed by the abutment plate 91 of the sealing member 73.

Figure 7:
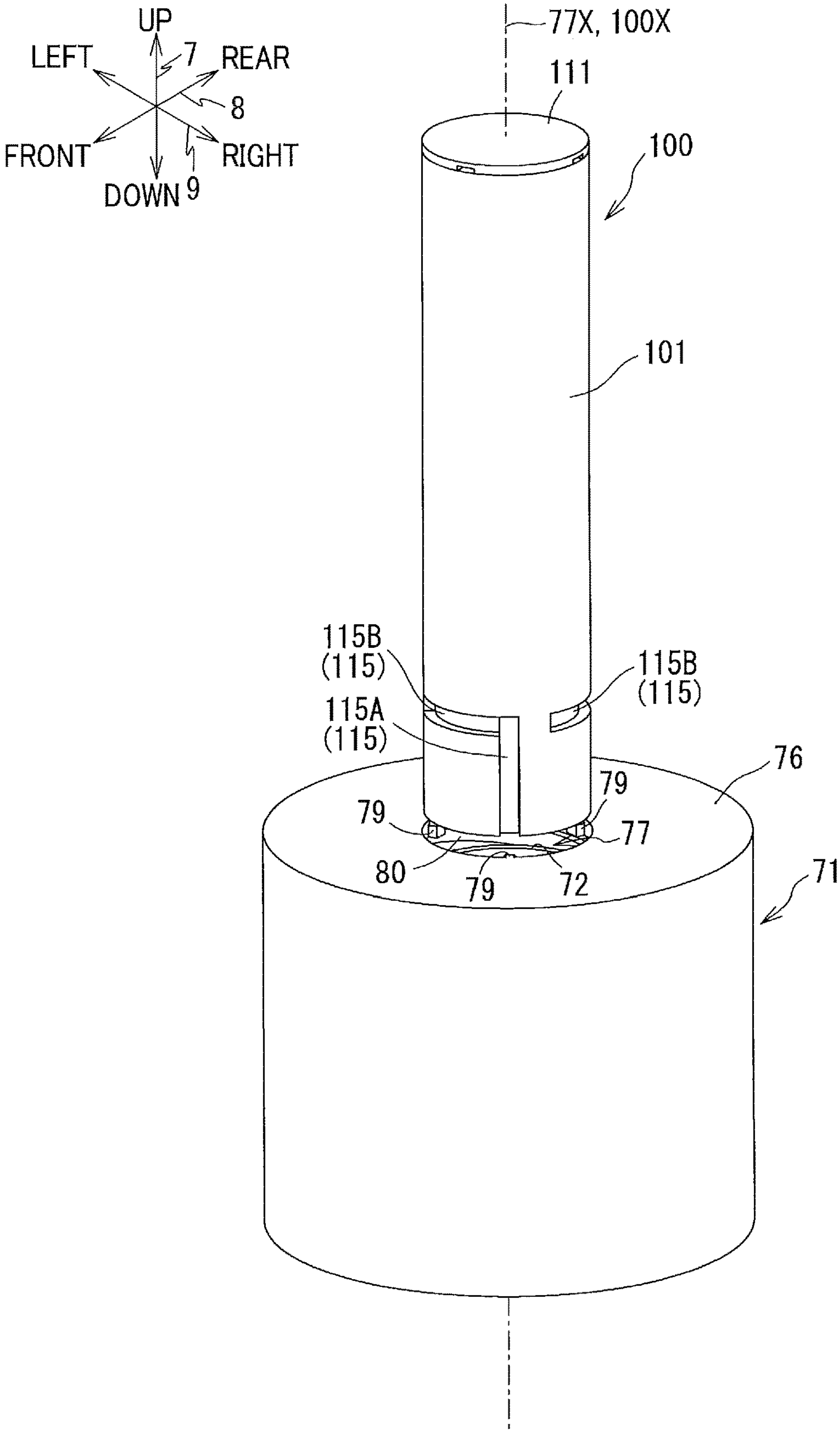
FIG. 7 is a perspective view illustrating the tank 70 and the bottle 100 prior to the insertion of the bottle 100 to a recessed portion 77 of the tank 70.
Figure 8:
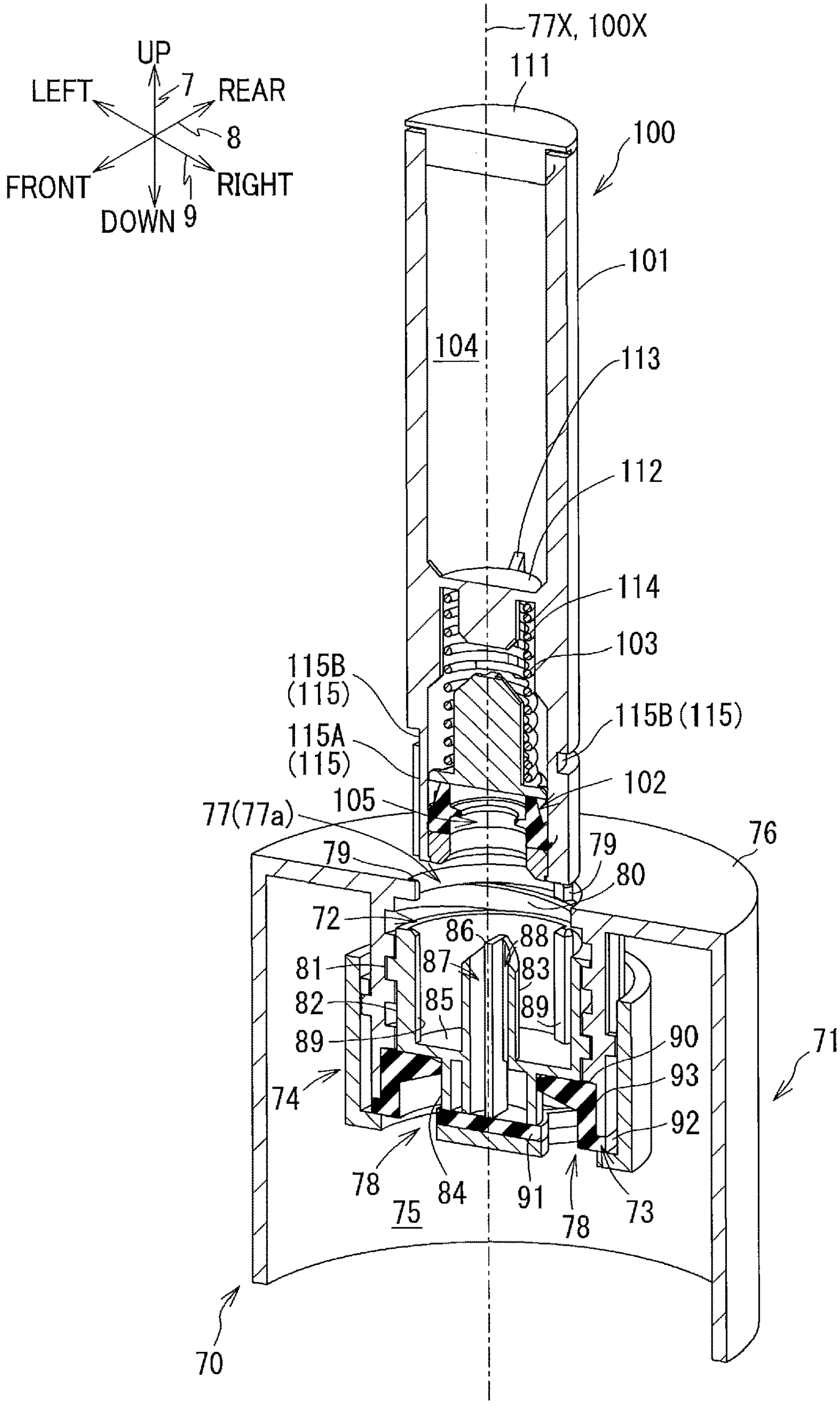
FIG. 8 is a cross-sectional view illustrating the tank 70 and the bottle 100 prior to the insertion of the bottle 100 to the recessed portion 77 of the tank 70 taken along the cross-section containing the axis 77X and extending in the up-down direction 7.

As illustrated in FIGS. 7 and 8, when inserting the lower end portion of the bottle 100 into the recessed portion 77, the user brings the first grooves 115A of the casing 101 into alignment with the respective protrusions 79 of the recessed portion 77. Upon positional alignment of the first groove 115A with the protrusion 79, the protrusions 79 are allowed to enter the corresponding first grooves 115A, and the bottle 100 can be inserted into the recessed portion 77 using the protrusions 79 as a guide.

Figure 9:
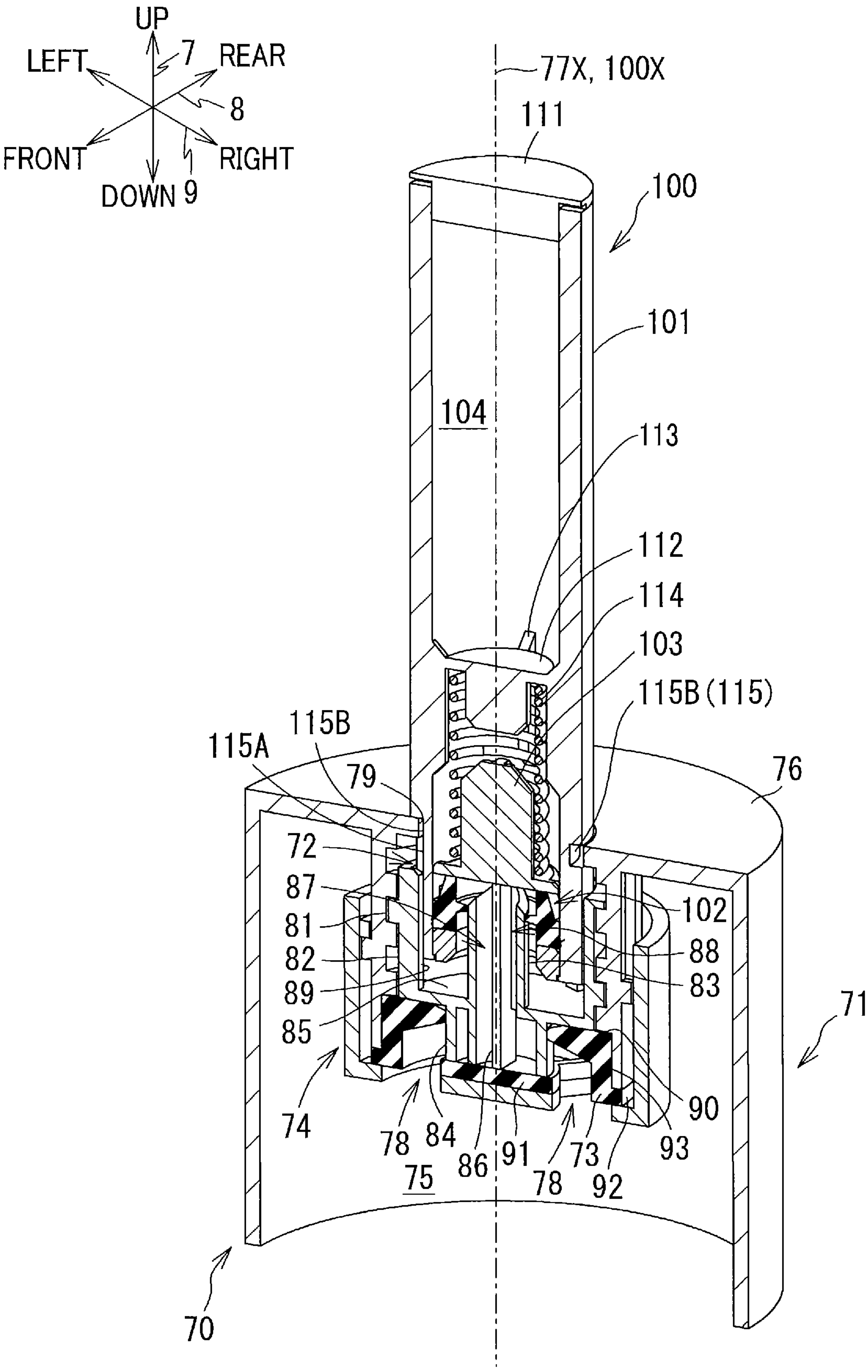
FIG. 9 is a cross-sectional view illustrating the tank 70 and the bottle 100 inserted in the recessed portion 77 of the tank 70 taken along the cross-section containing the axis 77X and extending in the up-down direction 7.

As illustrated in FIG. 9, the nozzle 83 of the tank 70 enters the supply opening 105 of the bottle 100 when each of the protrusions 79 reaches the upper end of the corresponding first groove 115A. The sealing member 102 comes into liquid tight contact with the outer peripheral surface of the nozzle 83. In this state, the valve 103 closes the supply opening 105.

Further, as illustrated in FIG. 9, the ribs 89 of the slider 72 enter the corresponding first grooves 115A. In this state, the casing 101 is rotatable counterclockwise about the axis 100X relative to the tank 70 with the guide of the protrusions 79. As the user rotates the casing 101 counterclockwise, the protrusions 79 enter into the corresponding second grooves 115B.

In response to the counterclockwise rotation of the casing 101, the ribs 89 also move counterclockwise because of the engagement between the respective pairs of the first grooves 115A and the ribs 89. That is, inside the recessed portion 77, no idle rotation of the slider 72 relative to the casing 101 occurs, and the slider 72 is ensured to rotate counterclockwise together with the casing 101. Since the male thread 81 of the slider 72 is threadingly engaged with the female thread 80 of the recessed portion 77, the slider 72 moves upward within the recessed portion 77 in response to the counterclockwise rotation of the slider 72, so that the slider 72 reaches its uppermost position as illustrated in FIG. 10. In accordance with the upward movement of the slider 72, the ribs 89 move upward relative to the corresponding first grooves 115A. Since the protrusions 79 are positioned in the corresponding second grooves 115B during the counterclockwise rotation of the casing 101, the casing 101 does not move upward relative to the recessed portion 77 in spite of the upward movement of the slider 72. Further, the casing 101 cannot be pulled out of the recessed portion 77 due to the engagement of the protrusions 79 in the corresponding second grooves 115B.

As illustrated in FIG. 10, when the slider 72 reaches its uppermost position inside the recessed portion 77, the nozzle 83, which has moved upward together with the slider 72, pushes the valve 103 upward against the urging force of the coil spring 114. Accordingly, the valve 103 is separated away from the sealing member 102, so that the ink in the storage chamber 104 of the bottle 100 can flow into the flow channel 87 of the nozzle 83. Further, the lower end of the nozzle 84 is also separated away from the abutment plate 91 of the sealing member 73, thereby allowing ink and air to circulate through the flow channels 87, 88 of the nozzle 84. Further, the flow channels 87, 88 of the nozzle 84 communicate with the injection opening 78 of the cover 74 along a perimeter of the abutment plate 91 of the cover 74.

As described above, the horizontal cross-sectional area of the flow channel 88 is greater in the lower region below the lower end wall 85 than in the upper region above the lower end wall 85 such that the flow channel 88 forms a stepwise flow channel. Therefore, water head difference is generated between an upper opening of the flow channel 87 and an upper opening of the flow channel 88. Accordingly, the ink stored in the storage chamber 104 is introduced into the flow channel 87 and flows into the tank storage chamber 75 of the tank 70 through the injection opening 78 of the cover 74.

As the ink flows into the tank storage chamber 75, air in the tank storage chamber 75 in turn flows into the storage chamber 104 through the flow channel 88. Here, a volume of the ink flowing from the storage chamber 104 to the tank storage chamber 75 is approximately equal to a volume of the air flowing from the tank storage chamber 75 to the storage chamber 104. In this way, so called gas-liquid substitution occurs. The gas-liquid substitution is terminated when all the ink in the storage chamber 104 of the bottle 100 flows into the tank storage chamber 75 of the tank 70.

Upon termination of the ink supply from the bottle 100 to the tank 70, the user rotates the casing 101 clockwise relative to the tank 70 from the state illustrated in FIG. 10 to the state illustrated in FIG. 9. As such, the protrusions 79 of the tank 70 now enter the corresponding first grooves 115A of the casing 101, thereby rendering the bottle 100 movable upward relative to the tank 70. When the bottle 100 is in the state illustrated in FIG. 9, leakage of ink through the supply opening 105 of the bottle 100 does not occur even if the bottle 100 is detached from the tank 70, since the valve 103 closes the supply opening 105. Further, the slider 72 moves downward within the recessed portion 77, since the slider 72 rotates clockwise in accordance with the clockwise rotation of the casing 101 relative to the tank 70. The lower end of the nozzle 84 thus comes into abutment with the abutment plate 91 of the sealing member 73, thereby closing the flow channels 87, 88.

Functions and Advantages of the Embodiment

As the bottle 100 is rotated counterclockwise with the ribs 89 of the slider 72 fitted with the corresponding first grooves 115A of the bottle 100, the slider 72 is also rotated and is slidingly moved in the up-down direction 7 together with the nozzles 83, 84. When the nozzle 83 of the slider 72 enters into the supply opening 105 of the bottle 100 to open the valve 103, the ink in the bottle 100 flows into the tank storage chamber 75 of the tank 70 through the nozzles 83, 84.

Further, the slider 72 is slidingly moved upward relative to the recessed portion 77 while rotating counterclockwise, by the threading engagement of the slider 72 with the recessed portion 77. The sealing member 73 can open and close the lower end of the nozzle 84, depending on the relative position between the sealing member 73 and the slider body 82.

Further, by the fitting engagement of the protrusions 79 of the tank 70 with the corresponding second grooves 115B of the bottle 100, the bottle 100 does not move in the up-down direction 7 relative to the tank 70 during the rotation of the bottle 100 relative to the tank 70. Hence, the nozzle 83 of the slider 72 can securely enter into the supply opening 105 of the bottle 100. Further, there is no need for the user to hold the bottle 100 during the entry of the nozzle 83 into the supply opening 105, in an attempt to prevent the bottle 100 from moving in the up-down direction 7 against the urging force of the coil spring 114. Further, pop up of the bottle 100 relative to the tank 70 due to the urging force of the spring 114 is less likely to occur for detachment of the bottle 100 from the tank 70.

Modifications to the Embodiment

According to the above-described embodiment, the sealing between the slider 72 and the recessed portion 77 is provided by the liquid tight contact between the nozzle 84 of the slider 72 and the sealing member 73. However, the liquid tight sealing between the slider 72 and the recessed portion 77 may be provided by a different configuration from the embodiment.

Figure 11:
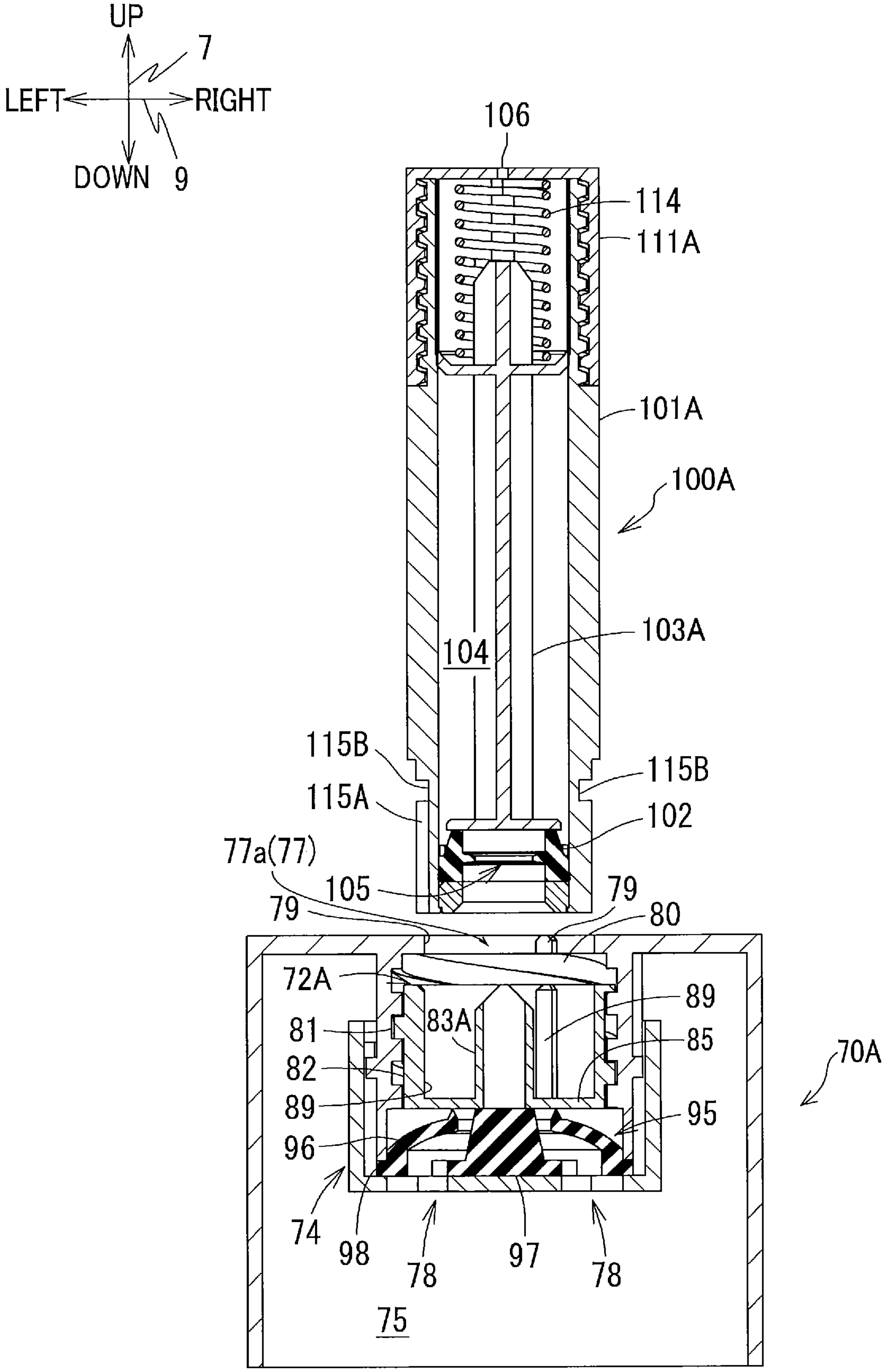
FIG. 11 is a cross-sectional view illustrating a tank 70A and a bottle 100A according to a modification prior to the insertion of the bottle 100A to the recessed portion 77 of the tank 70A taken along a cross-section corresponding to the cross-section of FIG. 8.
Figure 12:
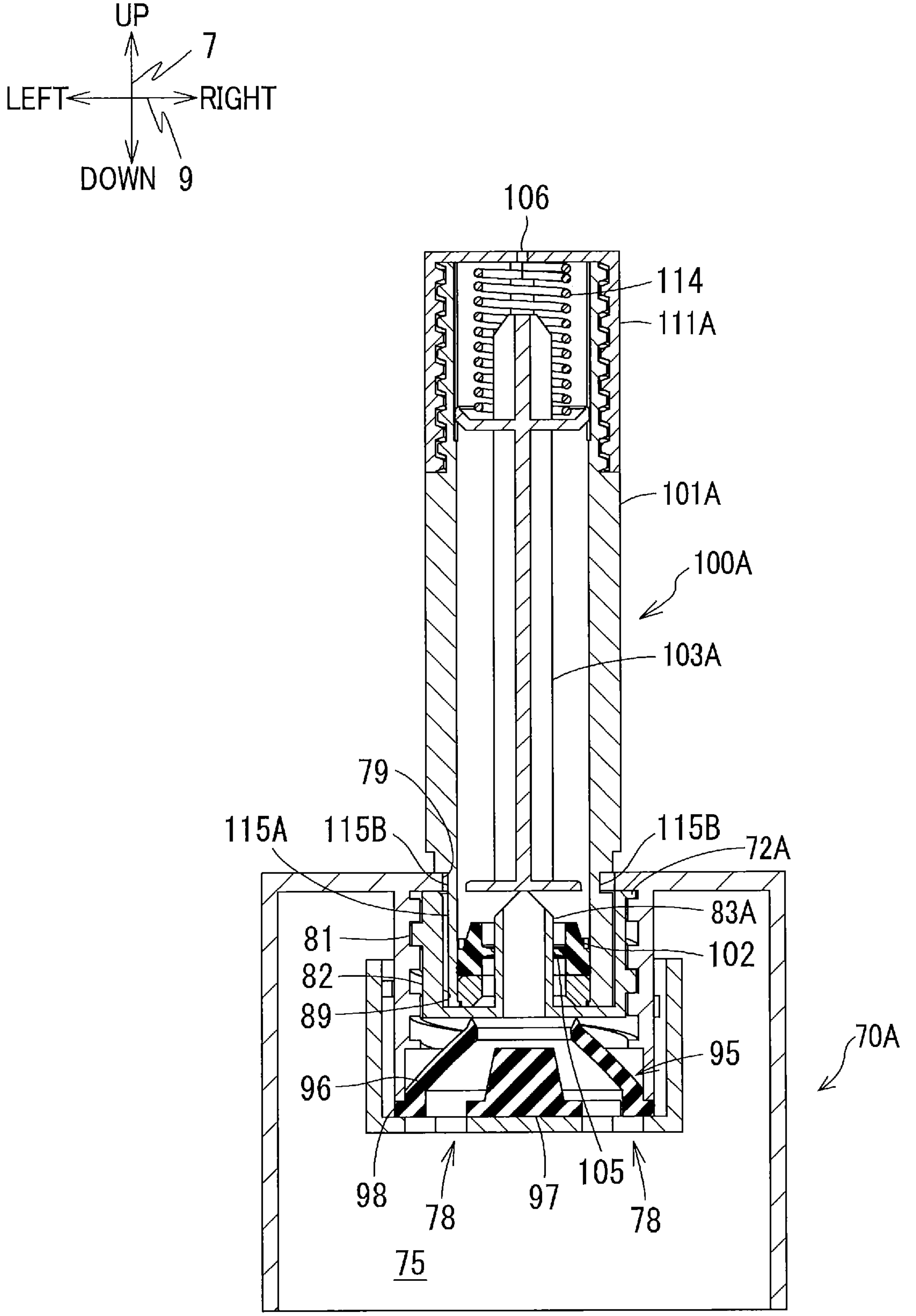
FIG. 12 is a cross-sectional view illustrating the tank 70A and the bottle 100A inserted in the recessed portion 77 of the tank 70A taken along the cross-section corresponding to the cross-section of FIG. 8.

As an example, FIGS. 11 and 12 depict a tank 70A and a bottle 100A according to a modification to the embodiment. In this modification, the tank 70A includes a slider 72A and a sealing member 95, instead of the slider 72 and the sealing member 73 of the embodiment. Unlike the slider 72, the slider 72A according to this modification does not include the nozzle 84, and includes a nozzle 83A in place of the nozzle 83 of the embodiment. The sealing member 95 is provided in the recessed portion 77 of the tank 70A, in place of the sealing member 73 of the embodiment.

The sealing member 95 is an elastically deformable member made from elastomer or rubber. The sealing member 95 includes a peripheral wall 96 having a generally flattened conical shape, as illustrated in FIGS. 11 and 12. The peripheral wall 96 has an upper open end. While making elastic deformation, the peripheral wall 96 is in contact with the lower end wall 85 in a region around the lower end opening of the nozzle 83A of the slider 72A. The sealing member 95 also includes an abutment portion 97 positioned at an internal space surrounded by the peripheral wall 96. The abutment portion 97 has a generally solid tapered shape. The abutment portion 97 closes the lower end opening of the nozzle 83A when the slider 72A is at its lowermost position (illustrated in FIG. 11). The abutment portion 97 has an outer diameter smaller than an inner diameter of the lower end portion of the peripheral wall 96. The abutment portion 97 is connected to the peripheral wall 96 through a plurality of connecting portions such that the abutment portion 97 is positioned at a diametrical center of the peripheral wall 96.

Ink can flow through gaps between the abutment portion 97 and the peripheral wall 96. A flange 98 protrudes outward from the lower end portion of the peripheral wall 96. The flange 98 is nipped between the cover 74 and the recessed portion 77 so as to be immovably fixed in the up-down direction 7. In this way, the internal space of the recessed portion 77 is liquid-tightly sealed against the tank storage chamber 75.

As illustrated in FIG. 12, the lower end opening of the nozzle 83A is separated from the abutment portion 97 when the slider 72A is at its uppermost position. At this time, the upper end of the peripheral wall 96 is in contact with the lower end wall 85 of the slider 72A due to the elastic restoration of the peripheral wall 96. As such, ink can flow from the lower end opening of the nozzle 83A to the injection opening 78 of the cover 74.

As illustrated in FIGS. 11 and 12, unlike the nozzle 83 of the above-described embodiment, the nozzle 83A of the slider 72A may not be partitioned into two channels but defines a single channel therein.

The bottle 100A includes a casing 101A, and a cap member 111A in place of the cap member 111 of the embodiment. The cap member 111A is formed with an air communication passage 106. The air communication passage 106 may be sealed with a semi-permeable membrane, or may has a labyrinth structure, or may be opened and closed by a valve in order to avoid leakage of ink. As illustrated in FIGS. 11 and 12, the coil spring 114 may be positioned in the storage chamber 104 of the bottle 100A such that the coil spring 114 is interposed between a valve 103A and the cap member 111A. In this case, a shape of the valve 103A may be suitably modified, provided that the valve 103A can open and close the supply opening 105 of the bottle 100A.

Other Variations and Modifications (1) Incidentally, according to the above-described embodiment, the casing 101 of the bottle 100 (liquid container) is hollow cylindrical, but the shape of the liquid container need not be limited to that of the embodiment. For example, the casing 101 may have a bottle-like shape other than the hollow cylindrical shape. For example, FIGS. 13A and 13B respectively depict liquid containers whose shapes are different from the hollow cylindrical shape of the bottle 100 of the embodiment.

Figure 13A:
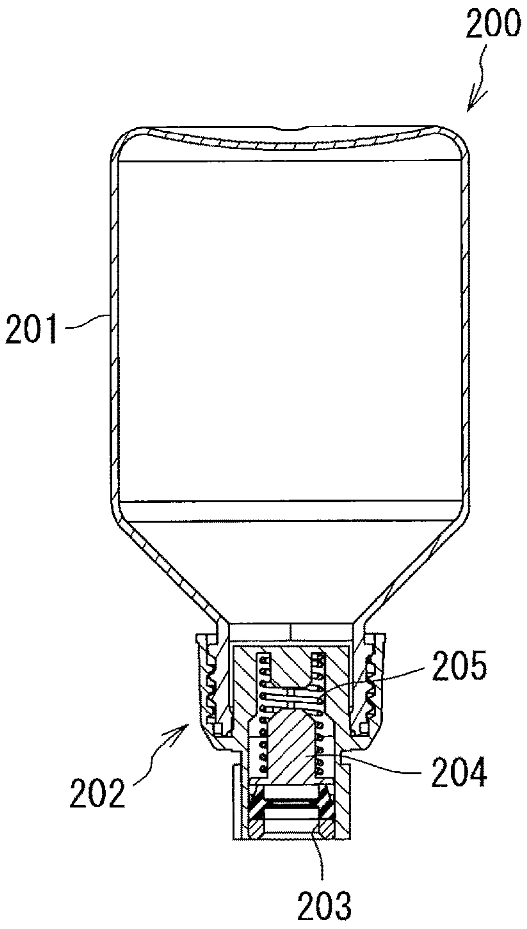
FIG. 13A is a cross-sectional view of a liquid container 200.

Referring to FIG. 13A, a liquid container 200 includes a container 201 having a narrow mouth and produced by blow molding, and a supply portion 202 threadingly engaged with the narrow mouth. The supply portion 202 includes a sealing member 203, a valve 204, and a coil spring 205 corresponding to the sealing member 102, the valve 103, and the coil spring 114 of the embodiment, respectively. The liquid container 200 is configured to supply liquid to the tank 70 provided with the nozzle 83 having two flow channels 87, 88.

Figure 13B:
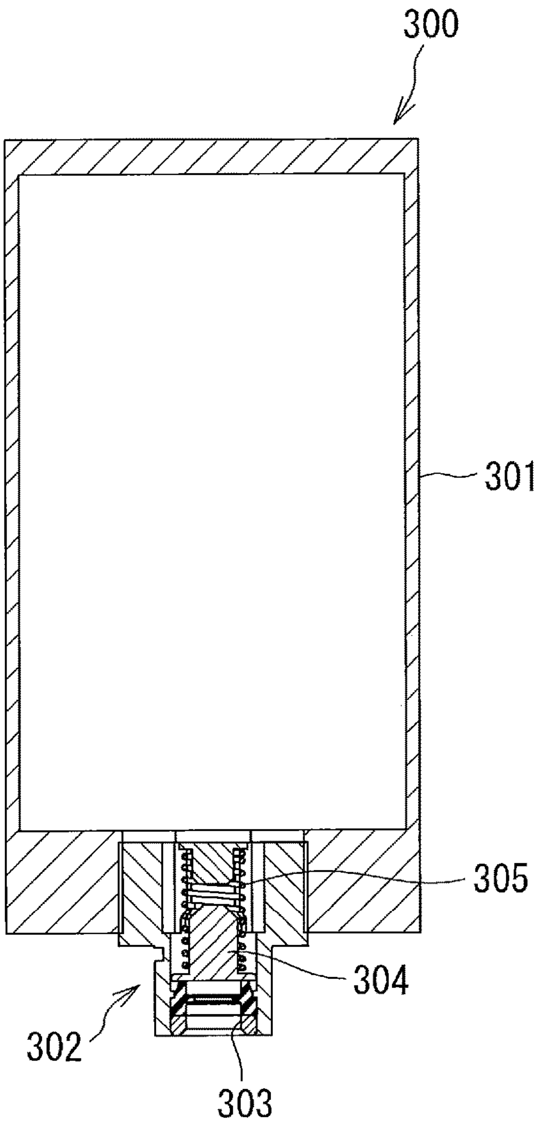
FIG. 13B is a cross-sectional view of a liquid container 300.

Referring to FIG. 13B, a liquid container 300 includes a pouch 301 produced by welding two resin sheets together, and a supply portion 302 connected to the pouch 301 by welding. The supply portion 302 includes a sealing member 303, a valve 304, and a coil spring 305 corresponding to the sealing member 102, the valve 103, and the coil spring 114 of the embodiment, respectively. The liquid container 300 according to this variation is configured to supply liquid to the tank 70A including the nozzle 83A without the partition wall 86 providing a single flow channel (see FIGS. 11 and 12).

Figure 14B:
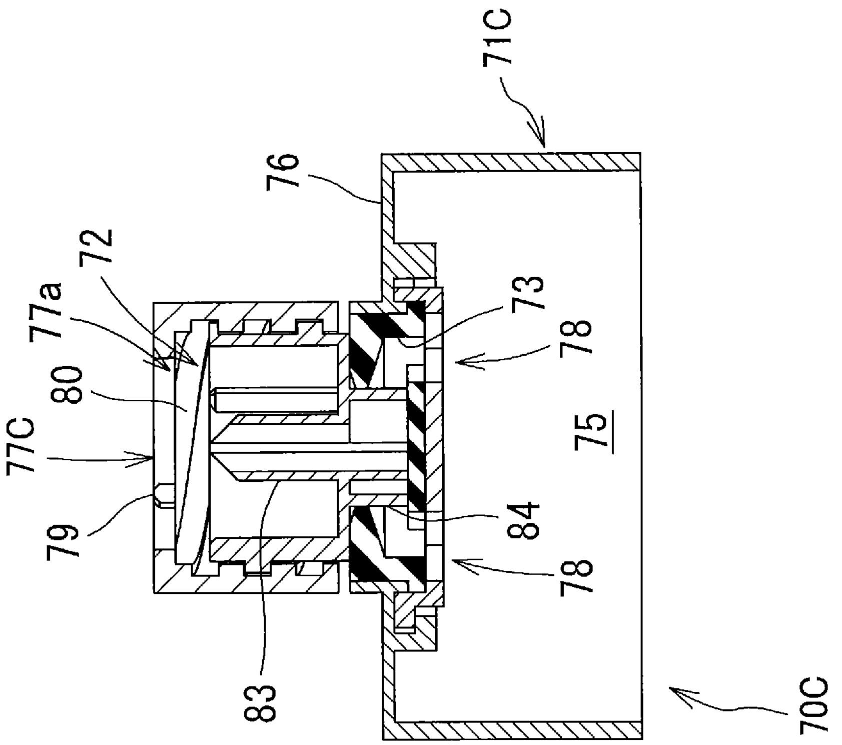
FIG. 14B is a partial cross-sectional view of a tank 70C including a tank body 71C and a recessed portion 77C provided separately from the tank body 71C.
Figure 14A:
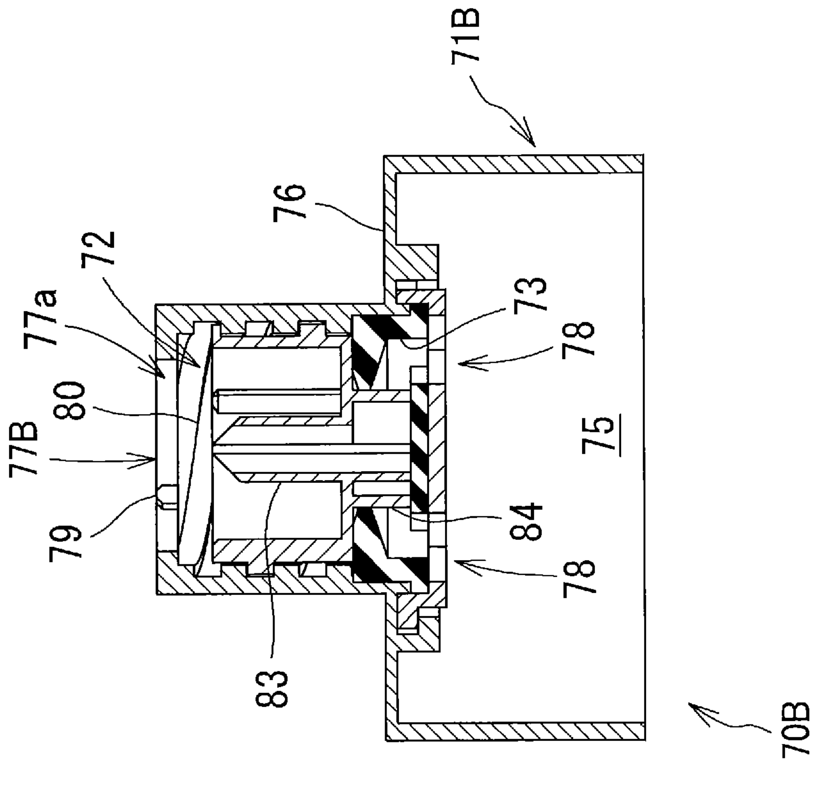
FIG. 14A is a partial cross-sectional view of a tank 70B including a tank body 71B and a recessed portion 77B protruding upward from an upper wall 76B of the tank body 71B.

(2) With respect to the tank 70 of the embodiment, the recessed portion 77 is formed at the upper wall 76. However, the recessed portion of the disclosure may be formed at a portion other than the upper wall of the tank. For example, the recessed portion may be formed at an outer surface of the tank and at a sloped wall inclined with respect to the up-down direction 7. Further, the recessed portion may not be recessed from the upper wall. For example, FIG. 14A illustrates a recessed portion 77B according to a variation of the recessed portion 77 of the embodiment. The recessed portion 77B is a hollow cylindrical portion protruding upward from an upper wall 76B of a tank body 71B of a tank 70B. Still further, the tank of the disclosure need not be mounted on the carriage 40. Instead, the tank may be connected to the head 38 to provide fluid communication of ink therebetween by a tube, for example.

(3) Further, each of the tank body 71, the slider 72, and the cover 74 may not be an integral product, but a plurality of members may be assembled together to constitute the same. For example, as illustrated in FIG. 14B, a tank 70C includes a tank body 71C and a recessed portion 77C respectively constituted by separate members. Similarly, the casing 101 and the valve 103 may not be integral products, but may be constituted by assemblies of separate members.

(4) Further, in the above-described embodiment, ink is used as one example of liquid for printing. However, the liquid for printing is not limited to the ink. For example, the liquid for printing may be: pretreatment liquid to be ejected to printing sheets prior to ink ejection; and water to be sprayed for avoiding dewatering of the nozzle 39 of the head 38.

While the description has been made in detail with reference to the embodiments, it would be apparent to those skilled in the art that many modifications and variations may be made thereto.

Remarks

The multifunction device 10 is an example of a liquid supplying device. The tanks 70, 70A, 70B, 70C are examples of a tank. The tank bodies 71, 71B, 71C are examples of a tank body. The tank storage chamber 75 is an example of a tank storage chamber. The recessed portions 77, 77B, 77C are examples of a recessed portion. The connection opening 77*a* of the recessed portions 77, 77B, 77C is an example of a connection opening. The sliders 72, 72A are examples of a slider. The nozzles 83, 84 are examples of a nozzle. The communication opening 84*a* is an example of a communication opening. The sealing members 73, 95 are examples of a sealing member. The injection opening 78 is as an example of an injection opening. The rib 89 is an example of a fitting portion and an example of a first fitting portion. The protrusion 79 is as an example of a second fitting portion. The bottle 100 and the liquid containers 200, 300 are examples of a liquid container. The storage chamber 104 is an example of a container storage chamber. The coil spring 114 is an example of a resiliently urging member. The groove 115 is an example of a counter-fitting portion. The first groove 115A is an example of a first part, and the groove 115B is an example of a second part of the counter-fitting portion. The lowermost position of the slider 72 is an example of a first position, and the uppermost position of the slider 72 is an example of a second position.

What is claimed is:

1. A tank to which a liquid container storing liquid to be supplied to the tank is connectable, the tank comprising:

a tank body defining a tank storage chamber configured to store the liquid therein; and a slider including a nozzle connectable to the liquid container and extending in an extending direction, the nozzle having a communication opening configured to communicate with the tank storage chamber of the tank body, the slider being rotatable about an axis extending in the extending direction relative to the tank body and being movable in the extending direction relative to the tank body to open and close the communication opening in accordance with rotations of the slider.

2. The tank according to claim 1, further comprising:

a fitting portion provided at the slider and configured to be fitted with the liquid container.

3. The tank according to claim 1, further comprising:

a recessed portion provided at the tank body and having an injection opening in communication with the tank storage chamber, the recessed portion having a connection opening through which the liquid container is connectable, wherein the slider is positioned in the recessed portion and is rotatable relative to the recessed portion, and the communication opening of the nozzle is configured to communicate with the injection opening of the recessed portion; and a sealing member configured to provide a liquid tight sealing to a gap between the slider and the recessed portion, and configured to also allow the liquid to flow between the communication opening of the nozzle and the injection opening of the recessed portion.

4. The tank according to claim 3, wherein the slider comprises a slider body threadingly engaged with the recessed portion, and the slider being movable between a first position and a second position, the second position being closer to the connection opening than the first position is to the connection opening in the extending direction, wherein the sealing member is configured to close the communication opening of the nozzle when the slider body is at the first position, and wherein the sealing member is configured to open the communication opening of the nozzle when the slider body is at the second position.

5. The tank according to claim 1, wherein the nozzle defines therein a first channel and a second channel.

6. The tank according to claim 5, wherein the first channel has a horizontal cross-sectional area that is constant in the extending direction, and wherein the second channel comprises:

a first portion whose horizontal cross-sectional area is constant in the extending direction; and a second portion whose horizontal cross-sectional area is greater than the horizontal cross-sectional area of the first portion, the second portion being closer to the communication opening than the first portion is to the communication opening in the extending direction.

7. A liquid supplying system comprising a liquid container and a tank, wherein the liquid container comprises:

a casing;

a container storage chamber defined in the casing and storing therein liquid to be supplied to the tank;

a supply opening providing fluid communication between the container storage chamber and an outside of the casing; and a counter-fitting portion provided at the casing, wherein the tank comprises:

a tank body defining a tank storage chamber configured to store liquid therein the liquid supplied from the container storage chamber; and a slider including a nozzle connectable to the liquid container and extending in an extending direction, the nozzle having a communication opening configured to communicate with the tank storage chamber of the tank body, the slider being rotatable about an axis extending in the extending direction relative to the tank body and being movable in the extending direction relative to the tank body to open and close the communication opening in accordance with rotations of the slider.

8. The liquid supplying system according to claim 7, wherein the liquid container further comprises:

a valve configured to open and close the supply opening; and a resiliently urging member urging the valve toward the supply opening.

9. The liquid supplying system according to claim 7, wherein the casing has an air communication passage configured to provide communication between the container storage chamber and the outside of the casing.

10. The liquid supplying system according to claim 7, further comprising:

a first fitting portion provided at the slider and configured to be fitted with the liquid container.

11. The liquid supplying system according to claim 10, further comprising:

a recessed portion provided at the tank body and having an injection opening in communication with the tank storage chamber, the recessed portion having a connection opening through which the liquid container is connectable, wherein the slider is positioned in the recessed portion and is rotatable relative to the recessed portion, and the communication opening of the nozzle is configured to communicate with the injection opening of the recessed portion; and a sealing member configured to provide a liquid tight sealing to a gap between the slider and the recessed portion, and configured to also allow the liquid to flow between the communication opening of the nozzle and the injection opening of the recessed portion.

12. The liquid supplying system according to claim 11, wherein the slider comprises a slider body threadingly engaged with the recessed portion, and the slider being movable between a first position and a second position, the second position being closer to the connection opening than the first position is to the connection opening in the extending direction, wherein the sealing member is configured to close the communication opening of the nozzle when the slider body is at the first position, and wherein the sealing member is configured to open the communication opening of the nozzle when the slider body is at the second position.

13. The liquid supplying system according to claim 10, wherein the counter-fitting portion comprises: a first part extending in the extending direction and open at a lower end of the casing; and a second part extending from the first part in a direction following the rotations of the slider, wherein the tank further comprises a second fitting portion provided at the recessed portion and configured to be fitted with the counter-fitting portion of the liquid container, wherein the first fitting portion is configured to be fitted with the first part to restrict the liquid container from rotating relative to the slider, and wherein the second fitting portion is configured to be fitted with the second part to allow the liquid container to rotate relative to the recessed portion but to restrict the liquid container from moving in the extending direction relative to the recessed portion.

14. The liquid supplying system according to claim 13, wherein the first fitting portion is a rib provided on an inner surface of the slider body, and wherein the second fitting portion is a protrusion provided around the connection opening of the recessed portion to protrude from an inner surface of the recessed portion.

15. The liquid supplying system according to claim 7, wherein the nozzle defines therein a first channel and a second channel.

16. The liquid supplying system according to claim 15, wherein the first channel has a horizontal cross-sectional area that is constant in the extending direction, and wherein the second channel comprises:

a first portion whose horizontal cross-sectional area is constant in the extending direction; and a second portion whose horizontal cross-sectional area is greater than the horizontal cross-sectional area of the first portion, the second portion being closer to the communication opening than the first portion is to the communication opening in the extending direction.

* * * * *